United States Patent [19]

Peterson

[11] 3,946,135

[45] Mar. 23, 1976

[54] RELEASE COATING COMPOSITION AND RELEASE PAPERS PREPARED THEREFROM

[75] Inventor: John O. H. Peterson, Cape Elizabeth, Maine

[73] Assignee: Scott Paper Company, Philadelphia, Pa.

[22] Filed: Nov. 7, 1974

[21] Appl. No.: 521,747

[52] U.S. Cl. ............. 428/411; 260/18 S; 260/19 R; 260/21; 260/17.2; 260/17.3; 260/29.1 SB; 260/29.3; 260/29.4 R; 428/526; 428/531
[51] Int. Cl.² ............................................ B32B 9/04
[58] Field of Search ........ 117/6; 161/406; 260/17.2, 260/17.3, 185, 19 R, 21, 29.3, 29.4, 29.1 SB; 428/526, 531, 411

[56] References Cited
UNITED STATES PATENTS 3,637,408    1/1972    Alert et al................................ 117/6

OTHER PUBLICATIONS

Chem. Absts. 78:125932x, "Enamel-Release Coatings . . . ;" Shipilevskii.
Chem. Absts. 78:138087a, "Surface Coating Compositions," Dengler.
Chem. Absts. 76:73889a, "Release Coatings for Fiberboard Containers, " Dunholter et al.

*Primary Examiner*—Donald E. Czaja
*Assistant Examiner*—Edward Woodberry
*Attorney, Agent, or Firm*—John W. Kane; John A. Weygandt

[57] ABSTRACT

A release paper which is particularly useful in platen press applications and in the casting of self-supporting films which comprises a fibrous base having a coating thereon derived from an aqueous coating composition containing a release agent, a monomeric polyhydric alcohol and a cross-linkable, thermosetting resin.

24 Claims, No Drawings

RELEASE COATING COMPOSITION AND RELEASE PAPERS PREPARED THEREFROM

BACKGROUND OF THE INVENTION

1. Field of the Invention

The present invention relates to coatings for paper or other fibrous substrates which are generally classified in the art as release coatings and which are characterized by their ability to separate intact from a surface or material which is normally adherent or adhesive in nature. There are many applications for such coatings and bases so coated, ranging from packaging materials for tacky products such as asphalt, to press release papers which are used in the preparation of decorative laminates.

2. Description of the Prior Art

Although there is a large body of prior art relating to release papers and coatings, the requirements for such papers and coatings may vary widely, depending primarily on the applications in which they are employed. For example, a release paper which is adequate for use as a packaging material may not satisfy the requirements necessary for a paper used in the "casting" of a thermoplastic film or sheet; and, similarly, a release paper which is adequate for a casting application may not be suitable in a platen press application wherein high temperatures and/or pressures are employed. In this latter application it is important for the release paper to provide very easy release from the surface of the laminate being "pressed", while at the same time enabling the user to maintain or control the gloss and surface texture desired in the panel or laminate being formed.

SUMMARY OF THE INVENTION

The present invention relates to a coating composition which is useful in the preparation of a release paper and to the release paper prepared therefrom. The coating composition comprises a release agent, a monomeric polyhydric alcohol and a cross-linkable, thermosetting resin, and the resulting release paper is highly useful in press release applications wherein decorative panels and/or laminates are being formed and it is also suitable for casting self-supporting plastic films. The coating compositions of this invention exhibit excellent stability and potlife. The release papers prepared therefrom provide very easy release in the pressing of laminates, such as melamine and polyester panels, wherein a wide range of pressures is employed. These papers may be reusable, and they permit excellent control over the gloss and surface texture of the panels being pressed.

DESCRIPTION OF THE PREFERRED EMBODIMENTS

As hereinbefore indicated, the coating compositions of this invention are aqueous coating compositions comprising a release agent, a monomeric polyhydric alcohol and a cross-linkable, thermosetting resin. Illustrative of the types of release agents which can be employed in the coating compositions of this invention are the Werner type chromium complexes such as those sold under the Tradename "Quilon" by E. I. DuPont de Nemours and Company, Inc., c/o Wilmington, Delaware, (e.g., Quilon S — the stearic acid complex, Quilon M — the myristic acid complex) fatty acid alcohols (e.g. 2ethylhexanol, dodecyl alcohol), silicone oils, fatty acids, (e.g. neodecanoic acid), and the like.

Illustrative of the types of monomeric, polyhydric alcohols which are useful in the coating compositions of the present invention are alcohols such as pentaerythritol, glycerine (glycerol), sugars (e.g., sucrose), tartaric acid (didhydroxysuccinic acid), and the like.

Illustrative of the types of cross-linkable thermosetting resins which are useful in the coating compositions of this invention are resins such as urea-formaldehyde resin condensates, melamine-formaldehyde resin condensates, phenolic resins, and the like.

The amounts of the various components used in the coating compositions of this invention are not narrowly critical, and can range, for example, from about 10 parts by weight (dry) to about 30 parts by weight (dry) of release agent per 100 parts by weight (dry) of coating, from about 5 parts by weight (dry) to about 50 parts by weight (dry) of monomeric polyhydric alcohol per 100 parts by weight (dry) of coating, and from about 20 parts by weight (dry) to about 60 parts by weight (dry) of cross-linkable thermosetting resin per 100 parts by weight (dry) of coating.

In addition to the essential components set forth above, the coating compositions of the present invention may also contain other components such as antifoam agents, dyes, colorants, and the like.

Release papers are prepared from the coating compositions of this invention by applying such a composition to a suitable base and then heating the resulting coated base until the release coating thereon has been dried and cured. The principal requirement for the substrate or base to be suitable is that it have a relatively smooth surface which resists substantial penetration of the aqueous coating composition into the base. In the case of a cellulosic fibrous substrate such as paper, this requirement is typically met by providing the paper with a coating which comprises a mineral pigment (e.g., clay) and adhesive or binder.

The following examples are intended to further illustrate the invention disclosed and claimed herein, but they are not intended to limit the scope thereof in any way. All parts and percentages are parts and percentages by weight, and not by volume, unless specifically stated otherwise in the particular example.

EXAMPLE 1

A coating formulation was prepared comprising the following components:

| Component | Parts by Weight (Wet) |
|---|---|
| Pentaerythritol | 20.0 |
| Water | 257.2 |
| Resimene X735 (an 80% solution in methanol of a methylated melamine-formaldehyde resin condensate sold by Monsanto Co. of St. Louis, Missouri.) | 62.5 |
| Quilon H (a 42% solution in an isopropyl alcohol-acetone-water mixture of a Werner type chromic chloride complex with myristic acid sold by E. I. DuPont de Nemours & Co., Inc. of Wilmington, Delaware). | 71.4 |
| Coating solids = 25% | |

The resulting coating formulation was then coated on a 53 lbs. per 3,300 sq. ft. ream bodystock that had been previously base coated (10 lbs. per 3,300 sq. ft. ream)

with a clay-adhesive dispersion to yield, on drying at 300°F for 1½ minutes, a release paper having a release coating thereon of approximately 3.0 lbs. per 3,300 sq. ft. ream.

This release paper was then subsequently used to "press" a laminate that is generally referred to in the industry as a "low pressure" decorative laminate.

Over a three-fourths inch particle board which is used as a base to impart strength and rigidity to the panel, was placed a porous decorative paper that was saturated with a partially cured melamine resin. This paper is well known in the trade as a lowpressure, melamine "prepreg". Finally the release paper was placed over the prepreg with its release surface in contact with the prepreg.

This composite or sandwich was placed in a press at 335 psi. and at a temperature of 320°F for 1½ minutes. Upon removal from the press the release paper exhibited excellent release by literally falling off the panel which was pressed. The quality of the panel surface was excellent with regard to gloss, texture, lack of mottle, etc. As evidence of the reuseability of the release paper, as many as four panels were subsequently pressed using the same sheet of release paper with no observable differences in panel surface quality.

EXAMPLE 2

A coating formulation was prepared comprising the following components:

| Component | Parts by Weight (Wet) |
|---|---|
| Glycerine | 10 |
| Resimene X-735 | 62.5 |
| Water | 174.5 |
| Quilon H | 59.5 |
| Dodecyl alcohol; 50% in isopropyl alcohol | 20 |
| 2-ethylhexyl alcohol, 50% in isopropyl alcohol | 20 |
| Coating solids = 29.5% | |

The resulting coating formulation was then coated on a 53 lbs. per 3,300 sq. ft. ream bodystock that had been previously basecoated (10 lbs. per 3,300 sq. ft. ream) with a clay-adhesive dispersion, to yield, after drying at 300°F for 1½ minutes, a release paper having a release coating thereon of approximately 3 lbs. per 3,300 sq. ft. ream. The two additional components, namely the 2-ethylhexanol and the dodecyl alcohol, acted both as antifoam agents to reduce foaming in the formulation, and as additional release agents to enable a reduction in the amount of the Quilon H release agent employed without any substantial reduction in the properties or behavioral characteristics of the resulting release paper.

This release paper was employed in a manner similar to that set forth with respect to the release paper obtained in Example 1, and, as in the case of Example 1, the quality of the resulting pressed surface was excellent.

EXAMPLE 3

A coating formulation was prepared comprising the following components:

| Component | Parts by Weight (Wet) |
|---|---|
| Resimene X-970 (an 85% solution in isobutanol of a urea-formaldehyde resin condensate sold by Monsanto Co. of St. Louis, Missouri). | 59 |
| Quilon S (a 30% solution in isopropyl alcohol of a Werner type chromic chloride complex with stearic acid sold by E. I. DuPont de Nemours & Co., Inc. of Wilmington, Delaware). | 50 |
| Dodecyl alcohol, 50% in isopropanol | 14 |
| 2-ethylhexanol, 50% in isopropanol | 14 |
| Pentaerythritol | 20 |
| Water | 193 |
| Coating solids = 28.3% | |

The resulting coating formulation was then coated onto a paper web having a conventional clay-adhesive base coat in an amount of 10 pounds per 3,300 sq. ft. ream to yield, after drying at 300°F for 1½ minutes, a release paper having a release coating thereon of approximately 3.5 pounds per ream.

This release paper was superimposed over a particle board overlaid with a printed, melamine-saturated, decorative prepreg with the release surface in contact with the prepreg. The resulting composite was placed in a press for 90 seconds at 335 psi. and at a temperature of 320°F. Upon removal from the press, the release paper readily stripped cleanly from the decorative laminate. The quality of the panel surface was excellent.

EXAMPLE 4

A coating composition was prepared comprising the following components:

| Component | Parts by Weight (Wet) |
|---|---|
| A 65% solution in methanol of a phenolic resin sold by Pioneer Plastics of Auburn, Maine under the label "FL-415". | 77 |
| Pentaerythritol | 20 |
| Quilon S | 50 |
| Dodecyl alcohol, 50% in isopropanol | 14 |
| 2-ethylhexanol, 50% in isopropanol | 14 |
| Isopropanol | 10 |
| Water | 175 |
| Coating solids = 30.3% | |

This particular formulation was then applied to the same base as that employed in the immediately preceding example, Example 3; and all other conditions and testing were the same as those employed in Example 3. The results obtained with a release paper prepared from the coating formulation of the present Example were as good as those obtained with the release paper of Example 3.

EXAMPLE 5

A coating formulation was prepared comprising the following components:

| Component | Parts by Weight (Wet) |
|---|---|
| Water | 382 |
| Pentaerythritol | 40 |
| Resimene X-735 | 125 |
| Quilon H | 118 |
| Hexadecyl alcohol, 50% in isopropyl alcohol | 10 |
| Neodecanoic acid, 50% in isopropyl alcohol | 10 |

-continued

| Component | Parts by Weight (Wet) |
|---|---|
| Coating solids = 30% | |

This formulation was applied to a base identical to that used in Example 3. A composite was prepared using this paper and this composite was pressed under the same press conditions as Example 3. The quality of the resultant panel surface was excellent.

EXAMPLE 6

A coating formulation was prepared comprising the following components:

| Component | Parts by Weight (Wet) |
|---|---|
| Water | 297 |
| Pentaerythritol | 30 |
| Resimene X-735 | 94 |
| Quilon H | 53.6 |
| 2-ethylhexanol 50% in isopropyl alcohol | 30 |
| dodecyl alcohol 50% in isopropyl alcohol | 30 |
| Coating solids = 30% | |

The resulting coating formulation was then coated on a 53 lb. per 3,300 sq. ft. ream bodystock that had been previously base coated (10 lbs. per 3,300 sq. ft. ream) with a clay-binder dispersion to yield after drying at 300°F for 1½ minutes, a release paper having a release coating thereon of approximately 3 pounds per 3,300 sq. ft. ream.

This release sheet was placed in contact with a composite for pressing a high pressure laminate. The composite consisted of three kraft sheets saturated with phenolic resin, superimposed by a malamine saturated decoratively printed sheet and finally a clear melamine overlay.

With the release coating of the release paper in contact with the overlay this composite was placed in a cold press. The press conditions were then adjusted to 1200 psi and 300°F. The composite was pressed for 24 minutes, after which time the press was allowed to cool and the composite was removed. The release paper stripped cleanly from the laminate. The surface of the pressed laminate was excellent in all respects.

EXAMPLE 7

A coating formulation was prepared comprising the following components:

| Component | Parts by Weight (Wet) |
|---|---|
| Water | 174.5 |
| Sucrose | 10.0 |
| Resimene X-735 | 62.5 |
| Quilon H | 35.7 |
| Dodecyl alcohol, 50% in isopropyl alcohol | 20.0 |
| 2-ethylhexyl alcohol, 50% in isopropyl alcohol | 20.0 |
| Coating solids = 30.0% | |

This formulation was applied to a base identical to that used in Example 3. A composite was prepared using this paper and this composite was pressed under the same press conditions as Example 3. The quality of the resultant panel surface was excellent.

EXAMPLE 8

A coating formulation was prepared comprising the following components:

| Component | Parts by Weight (Wet) |
|---|---|
| Water | 197.5 |
| Tartaric acid | 20.0 |
| Resimene X-735 | 62.5 |
| Quilon H | 35.7 |
| Dodecyl alcohol, 50% in isopropyl alcohol | 20.0 |
| 2-ethylhexyl alcohol 50% in isopropyl alcohol | 20.0 |
| Coating solids = 30.5% | |

This formulation was applied to a base identical to that used in Example 3. A composite was prepared using this paper and this composite was pressed under the same press conditions as Example 3. The quality of the resultant panel surface was excellent.

The release paper of the present invention is also applicable for the preparation of self-supporting films. The following example is included to demonstrate this use.

EXAMPLE 9

A release paper was prepared according to the manner set out in Example 1. A polyvinyl chloride plastisol was then cast on the release coated surface using a Gardner metering knife to set down a wet film of one millimeter thickness. The plastisol was dried for 2 minutes at 100°C and cured for 2 minutes at 190°C. The cast film readily stripped from the release paper as a self-supporting film. The surface of the film had the same quality surface as the release coated paper.

EXAMPLE 10

A coating formulation was prepared comprising the following components:

| Component | Parts by Weight (Wet) |
|---|---|
| Water | 297 |
| Pentaerythritol | 30 |
| Resimene X-735 | 94 |
| Quilon H | 53.6 |
| 2-ethylhexanol 50% in isopropyl alcohol | 30 |
| dodecyl alcohol 50% in isopropyl alcohol | 30 |
| Coating solids = 30% | |

The resulting coating formulation was then coated on a 53 lb. per 3,300 sq. ft. ream bodystock that had been previously base coated (10 lbs. per 3,300 sq. ft. ream) with a clay-binder dispersion to yield after drying at 300°F for 1½ minutes, a release paper having a release coating thereon of approximately 3 pounds per 3,300 sq. ft. ream.

This release paper was superimposed over the surface of a polyester decorative prepreg on three-fourths inch particle board. This sandwich with the release paper in contact therewith was placed in a press at 200 psi and at a temperature of 285°F for 8 minutes. The quality of the resulting pressed surface was excellent.

It is well known that the gloss, texture and embossure of pressed and cast surfaces can be determined and controlled by qualities of the release coating and the substrate chosen for the release coating. These qualities are typically release coating weight, embossure, smoothness of the substrate, finishing of the substrate and the like. While the invention has been particularly shown and described with reference to preferred embodiments thereof, it is understood that these determinants and other changes and modifications will occur to a person skilled in the art without departing from the spirit and scope of the invention as defined in the appended claims.

What is claimed is:

1. A release coating formulation which comprises a release agent, a monomeric polyhydric alcohol and a cross-linkable, thermosetting resin.

2. A release coating formulation as claimed in claim 1 wherein the release agent is at least one of the release agents selected from the class consisting of Werner-type complexes of fatty acids with chromic chloride, fatty acids, fatty acid alcohols, and silicone oils.

3. A release coating formulation as claimed in claim 2 wherein the monomeric, polyhydric alcohol is selected from the class consisting of pentaerythritol, glycerine, a sugar and tartaric acid.

4. A release coating formulation as claimed in claim 3 wherein the cross-linkable thermosetting resin is selected from the class consisting of urea-formaldehyde resin condensates, melamine-formaldehyde resin condensates, and phenolic resins.

5. A release coating formulation as claimed in claim 4 wherein the release agent is a chromic chloride complex of myristic acid, the monomeric polyhydric alcohol is pentaerythritol, and the cross-linkable thermosetting resin in a melamine-formaldehyde resin condensate.

6. A release coating formulation as claimed in claim 4 wherein the release agent is a mixture of a chromic chloride complex of myristic acid, dodecyl alcohol and 2-ethylhexanol, the monomeric polyhydric alcohol is glycerine, and the cross-linkable thermosetting resin is a melamine-formaldehyde resin condensate.

7. A release coating formulation as claimed in claim 4 wherein the release agent is a mixture of a chromic chloride complex of stearic acid, the monomeric polyhydric alcohol is pentaerythritol, and the cross-linkable thermosetting resin is a urea-formaldehyde resin condensate.

8. A release coating formulation as claimed in claim 4 wherein the release agent is a mixture of a chromic chloride complex of stearic acid, the monomeric polyhydric alcohol is pentaerythritol, and the cross-linkable thermosetting resin is a phenolic resin.

9. A release coating formulation as claimed in claim 4 wherein the release agent is a mixture of a chromic chloride complex of myristic acid, hexadecyl alcohol and neodecanoic acid, the monomeric polyhydric alcohol is pentaerythritol, and the cross-linkable thermosetting resin is a melamine-formaldehyde resin condensate.

10. A release coating formulation as claimed in claim 4 wherein the release agent is a mixture of a chromic chloride complex of myristic acid, dodecyl alcohol and 2-ethylhexanol, the monomeric polyhydric alcohol is pentaerythritol, and the cross-linkable thermosetting resin is a melamine-formaldehyde resin condensate.

11. A release coating formulation as claimed in claim 4 wherein the release agent is a mixture of a chromic chloride complex of myristic acid, the monomeric polyhydric alcohol is sucrose, and the cross-linkable thermosetting resin is a melamine-formaldehyde resin condensate.

12. A release coating formulation as claimed in claim 4 wherein the release agent is a mixture of a chromic chloride complex of myristic acid, the monomeric polyhydric alcohol is tartaric acid, and the cross-linkable thermosetting resin is a melamine-formaldehyde resin condensate.

13. A release paper comprising a fibrous base having on at least one of the outer surfaces thereof an insoluble continuous release coating derived from a release coating formulation as claimed in claim 1.

14. A release paper comprising a fibrous base having on at least one of the outer surfaces thereof an insoluble continuous release coating derived from a release coating formulation as claimed in claim 2.

15. A release paper comprising a fibrous base having on at least one of the outer surfaces thereof an insoluble continuous release coating derived from a release coating formulation as claimed in claim 3.

16. A release paper comprising a fibrous base having on at least one of the outer surfaces thereof an insoluble continuous release coating derived from a release coating formulation as claimed in claim 4.

17. A release paper comprising a fibrous base having on at least one of the outer surfaces thereof an insoluble continuous release coating derived from a release coating formulation as claimed in claim 5.

18. A release paper comprising a fibrous base having on at least one of the outer surfaces thereof an insoluble continuous release coating derived from a release coating formulation as claimed in claim 6.

19. A release paper comprising a fibrous base having on at least one of the outer surfaces thereof an insoluble continuous release coating derived from a release coating formulation as claimed in claim 7.

20. A release paper comprising a fibrous base having on at least one of the outer surfaces thereof an insoluble continuous release coating derived from a release coating formulation as claimed in claim 8.

21. A release paper comprising a fibrous base having on at least one of the outer surfaces thereof an insoluble continuous release coating derived from a release coating formulation as claimed in claim 9.

22. A release paper comprising a fibrous base having on at least one of the outer surfaces thereof an insoluble continuous release coating derived from a release coating formulation as claimed in claim 10.

23. A release paper comprising a fibrous base having on at least one of the outer surfaces thereof an insoluble continuous release coating derived from a release coating formulation as claimed in claim 11.

24. A release paper comprising a fibrous base having on at least one of the outer surfaces thereof an insoluble continuous release coating derived from a release coating formulation as claimed in claim 12.

* * * * *